United States Patent
Kallas et al.

(10) Patent No.: US 10,983,983 B2
(45) Date of Patent: Apr. 20, 2021

(54) ENTITY RESOLUTION BASED ON MULTIPLE ATTRIBUTES

(71) Applicant: U.S. Bancorp, National Association, Minneapolis, MN (US)

(72) Inventors: Christopher J. Kallas, Grafton, WI (US); Xiaoqiao Wei, Woodbury, MN (US); Wentao Lu, Minnetonka, MN (US)

(73) Assignee: U.S. BANCORP, NATIONAL ASSOCIATION, Minneapolis, MN (US)

( * ) Notice: Subject to any disclaimer, the term of this patent is extended or adjusted under 35 U.S.C. 154(b) by 386 days.

(21) Appl. No.: 15/915,864

(22) Filed: Mar. 8, 2018

(65) Prior Publication Data
US 2019/0278855 A1    Sep. 12, 2019

(51) Int. Cl.
*G06F 16/00* (2019.01)
*G06F 16/23* (2019.01)
*G06F 16/951* (2019.01)

(52) U.S. Cl.
CPC ........ *G06F 16/2365* (2019.01); *G06F 16/951* (2019.01)

(58) Field of Classification Search
CPC ............................ G06F 16/2365; G06F 16/951
USPC ......................................................... 707/690
See application file for complete search history.

(56) References Cited

U.S. PATENT DOCUMENTS

| | | | | |
|---|---|---|---|---|
| 6,501,855 B1* | 12/2002 | Zelinski | ............. | G06K 9/00865 |
| | | | | 382/186 |
| 2003/0099399 A1* | 5/2003 | Zelinski | ............. | G06K 9/00865 |
| | | | | 382/186 |
| 2007/0276858 A1* | 11/2007 | Cushman, II | ......... | G06F 16/215 |
| 2008/0005106 A1* | 1/2008 | Schumacher | ..... | G06F 16/24556 |
| 2008/0243885 A1* | 10/2008 | Harger | .................... | G06F 16/21 |
| 2011/0119051 A1* | 5/2011 | Li | .......................... | G10L 15/187 |
| | | | | 704/10 |
| 2011/0153678 A1* | 6/2011 | Matsubara | .......... | H04L 41/0226 |
| | | | | 707/802 |
| 2017/0351733 A1* | 12/2017 | Zhou | .................... | G06Q 50/265 |
| 2017/0371949 A1* | 12/2017 | Le Biannic | ............. | G06F 16/22 |

* cited by examiner

*Primary Examiner* — Monica M Pyo
(74) *Attorney, Agent, or Firm* — Foley & Lardner LLP (57) ABSTRACT

Disclosed are a method, a system, and a non-transitory computer readable medium for identifying data entries associated with an entity. A first rule is applied on a plurality of data entries associated with a plurality of entities to obtain a first set of data entries from the plurality of data entries. Each data entry includes corresponding attributes. The first rule is to search for data entries with a first group of attributes. A second rule is applied on the plurality of data entries associated with a plurality of entities to obtain a second set of data entries from the plurality of data entries. The second rule is to search for data entries with a second group of attributes. A third set of data entries associated with a single entity is obtained based on the first set of data entries and the second set of data entries.

13 Claims, 10 Drawing Sheets

FIG. 1

| Database 150 | | | | | |
|---|---|---|---|---|---|
| Data Entry 200A | | | | | |
| Tax ID 210A | Name 220A | Address 230A | DOB 240A | Phone 250A | E-Mail 260A |
| Data Entry 200B | | | | | |
| Tax ID 210B | Name 220B | Address 230B | DOB 240B | Phone 250B | E-Mail 260B |
| Data Entry 200C | | | | | |
| Tax ID 210C | Name 220C | Address 230C | DOB 240C | Phone 250C | E-Mail 260C |
| Data Entry 200D | | | | | |
| Tax ID 210D | Name 220D | Address 230D | DOB 240D | Phone 250D | E-Mail 260D |

┌─────────────────────────────────────┐
│     Exact Email + Exact Name        │
│               510                   │
└─────────────────────────────────────┘

┌─────────────────────────────────────┐
│     Exact Tax ID + Exact Name       │
│               520                   │
└─────────────────────────────────────┘

┌─────────────────────────────────────┐
│    Exact Tax ID + Exact Address     │
│               530                   │
└─────────────────────────────────────┘

┌─────────────────────────────────────┐
│      Exact Tax ID + Exact DOB       │
│               540                   │
└─────────────────────────────────────┘

┌─────────────────────────────────────┐
│     Exact Tax ID + Exact Phone      │
│               550                   │
└─────────────────────────────────────┘

┌─────────────────────────────────────┐
│     Exact Tax ID + Exact E-Mail     │
│               560                   │
└─────────────────────────────────────┘

```
┌─────────────────────────────────────────────────────────┐
│   Exact Tax ID + Non-Exact DOB + Non-Exact Phone        │
│                         602                             │
└─────────────────────────────────────────────────────────┘

┌─────────────────────────────────────────────────────────┐
│   Exact Tax ID + Non-Exact Address + Non-Exact Phone    │
│                         604                             │
└─────────────────────────────────────────────────────────┘

┌─────────────────────────────────────────────────────────┐
│   Exact Tax ID + Non-Exact Address + Non-Exact DOB      │
│                         606                             │
└─────────────────────────────────────────────────────────┘
```

```
┌─────────────────────────────────────────────────────────┐
│   Exact Name + Non-Exact Tax ID + Non-Exact DOB         │
│                         610                             │
└─────────────────────────────────────────────────────────┘

┌─────────────────────────────────────────────────────────┐
│   Exact Name + Non-Exact Tax ID + Non-Exact Phone       │
│                         612                             │
└─────────────────────────────────────────────────────────┘

┌─────────────────────────────────────────────────────────┐
│   Exact Name + Non-Exact Tax ID + Non-Exact Address     │
│                         614                             │
└─────────────────────────────────────────────────────────┘

┌─────────────────────────────────────────────────────────┐
│   Exact Name + Non-Exact DOB + Non-Exact Phone          │
│                         616                             │
└─────────────────────────────────────────────────────────┘

┌─────────────────────────────────────────────────────────┐
│   Exact Name + Non-Exact DOB + Non-Exact Address        │
│                         618                             │
└─────────────────────────────────────────────────────────┘
```

> Exact Tax ID + Non-Exact First Name + Non-Exact Address
> 620

> Exact Tax ID + Non-Exact First Name + Non-Exact Phone
> 622

> Exact Tax ID + Non-Exact First Name + Non-Exact DOB
> 624

> Exact E-Mail + Exact First Name + Non-Exact Tax ID
> 630

> Exact E-Mail + Exact First Name + Non-Exact DOB
> 632

> Exact DOB + Non-Exact First Name + Non-Exact Address
> 640

> Exact DOB + Non-Exact First Name + Non-Exact Phone
> 642

> Exact DOB + Non-Exact First Name + Non-Exact Tax ID
> 644

| Exact Address + Non-Exact First Name + Non-Exact Tax ID |
| 650 |

| Exact Address + Non-Exact First Name + Non-Exact DOB |
| 652 |

| Exact Phone + Non-Exact First Name + Non-Exact Tax ID |
| 660 |

| Exact Phone + Non-Exact First Name + Non-Exact DOB |
| 662 |

ENTITY RESOLUTION BASED ON MULTIPLE ATTRIBUTES

BACKGROUND

The following description is provided to assist the understanding of the reader. None of the information provided is admitted to be prior art.

Proliferation of storage and network devices enables a large amount of data to be exchanged and stored. Large amount of data allows analysis or predictions that were not feasible before. For example, a big data analysis performed on more than millions or billions of data entries enables a prediction of a likelihood of a person defaulting on a mortgage payment through a statistical analysis.

Aggregating data involves performing data cleansing or entity resolution to remove or combine duplicative data entries from different sources. For example, some data entries from different data sources for a single entity are inconsistent, because different data entries are represented in different formats or because typographical errors are introduced during the data entry process. By performing data cleansing, inconsistent data entries for an entity may be corrected or duplicative data entries may be consolidated.

Often, performing data cleansing involves manual review of data entries. However, manually reviewing a large number of data entries (e.g., over 100 million) from various data sources may be inefficient and time consuming. Moreover, performing data analysis on duplicative data entries or data entries with errors may render inaccurate results.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Various embodiments disclosed herein are related to a computer implemented method, a system, and a non-transitory computer readable medium for performing entity resolution. Entity resolution is referred to identifying data entries associated with an entity, and synthesizing the data entries. An entity may be a person, a group of people, a company, an organization, etc. For example, two or more data entries of an entity are represented in different formats (e.g., different date formats, different address formats), or a data entry includes typographical errors or phonetic variations. According to the disclosed embodiments, multiple data entries likely to be associated with a single entity can be identified in a computationally efficient manner. The identified data entries can be linked, integrated or deduplicated.

In some embodiments, a first rule is applied on a plurality of data entries associated with a plurality of entities to obtain a first set of data entries from the plurality of data entries. Each data entry includes corresponding attributes. The first rule is to search for data entries with a first group of attributes. A second rule is applied on the plurality of data entries associated with the plurality of entities to obtain a second set of data entries from the plurality of data entries. The second rule is to search for data entries with a second group of attributes. A third set of data entries associated with a single entity is obtained by synthesizing the first set of data entries and the second set of data entries, for example, by linking duplicative data entries or data entries likely associated with a single entity.

Advantageously, applying different rules with combinations of different attributes on a larger number of data entries to generate different sets of data entries for a common entity allows data entries for the common entity to be identified in a computationally efficient manner. In one aspect, over-matches and under-matches can be reduced while allowing all or most data entries with same or similar attributes to be associated with a single entity. For example, data entries (e.g., name, address, etc.) with a slight difference within a predetermined threshold (e.g., one or two characters difference), data entries with phonetic variations, or data entries represented in different formats can be automatically identified and linked together. Linked data entries can be integrated or deduplicated, thereby enabling a data analysis to be performed in a time and computationally efficient manner with an improved accuracy.

Figure 1:
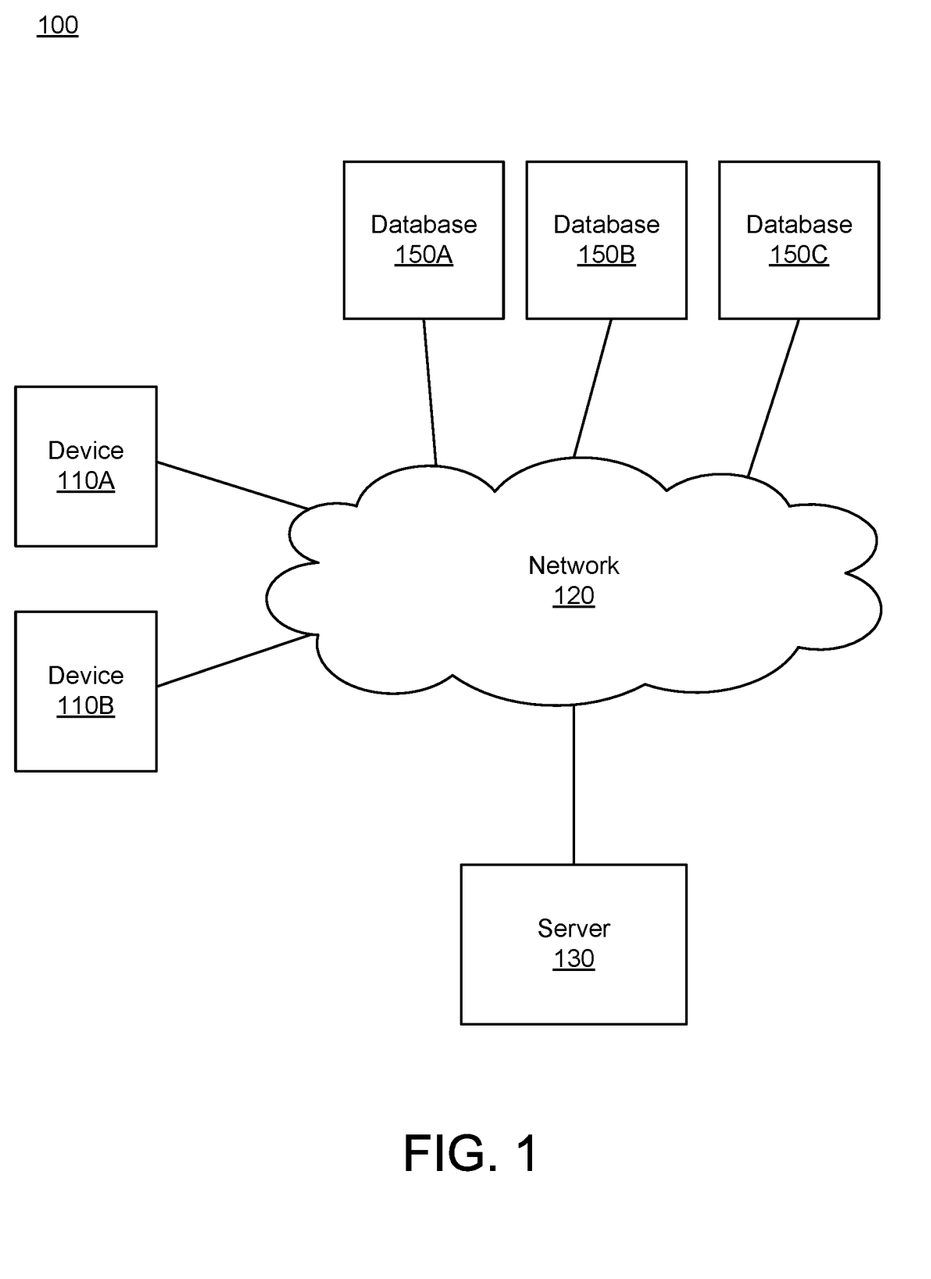
FIG. 1 is a block diagram of a computing environment according to an example embodiment.

Referring to FIG. 1, illustrated is a block diagram of a computing environment 100, according to an example embodiment. In some embodiments, the computing environment 100 includes devices 110A, 110B, a network 120, a server 130, and database 150A, 150B, 150C. These components operate together resolve inconsistent data entries or reduce duplicative or redundant data entries. In other embodiments, the computing environment 100 includes more, fewer, or different components than shown in FIG. 1. For example, there may be any number of devices 110, servers 130, network 120, or database 150.

The network 120 is a hardware component, through which the device 110, the server 130 and the database 150 can communicate. The network 120 is implemented as a wired network, a wireless network, or a combination of them. Examples of the wired network include a network based on Ethernet, USB, RS232, etc. Examples of the wireless network include a network based on satellite communication, 1G, 2G, 3G, 4G, 5G, 60 GHz communication, WiFi, Bluetooth, near field communication, etc.

The device 110 is a hardware device operated by a user. The device 110 may be embodied as a personal computer, a table PC, a smartphone, a server computer, etc. Through the device 110, the user may request to store data entries of one or more entities at the database 150. Through the device 110, the user may also request data entries related to a target entity or perform data analysis for the target entity. For example, the user may instruct the device 110 to extract data entries (e.g., name, tax identification number, date of birth, address, phone number, E-mail address) of the target entity. For another example, the user may instruct the device 110 to perform statistical analysis on the data entries to determine a likelihood of an event (e.g., missing credit card payment) of the target entity.

The database 150 is a hardware device storing a large amount of data. In one aspect, the database 150 stores data entries of multiple entities. The database 150 may receive data entries from the device 110, the server 130 or any computing device through the network 120. The database 150 may be implemented as a single independent database or a distributed database. According to the instructions from the server 130 through the network 120, the database 150 may store, delete, or modify data entries.

The server 130 is a hardware device that manages data stored by the database 150. The server 130 operates as an interface between the device 110 and the database 150. In one aspect, the server 130 receives data to be stored from the device 110 through the network 120, and stores the received data at the database 150. The device 110 may not be aware of which database 150 stores the data, but the server 130 may include a mapping table to identify which database 150 stores the data from the device 110. Alternatively, the device 110 may be aware of which database 150 stores the data. In another aspect, the server 130 receives a request from the device 110 to retrieve stored data, and in response to the request, obtains the stored data from the database 150 and forwards the obtained data to the requesting device 110. The server 130 may instruct the database 150 to forward the requested data to the device 110. In another aspect, the server 130 receives a request from the device 110 to perform data analysis (e.g., statistical analysis), and in response to the request, performs data analysis on data entries stored by the database 150, and returns a result of the analysis to the device 110.

In some embodiments, the server 130 performs entity resolution to link duplicative data entries or multiple data entries likely to be associated with a single entity. Duplicative data entries are data entries with exactly matching attributes. Data entries likely to be associated with a single entity are data entries having attributes with errors within a predetermined threshold (e.g., one or two characters off), attributes with phonetic variations, or attributes with variations in formats. For instance, if the attribute is the Name, then the phonetic function is applied and the hash value is set to be the same or 0. If the attribute is the Taxid, DoB, or Phone, then the edit distance measure is applied and the threshold is set to <=1. If the attribute is the Address, then it is separated into a numeric portion and a character portion. When the numeric subsets are the same, the edit distance measure is applied to the character subsets and the threshold is set to <=4. When the character subsets are the same, the edit distance measure is applied to the numeric subset S and the threshold is set to <=1. Assuming for an example that a first data entry includes "Name: John Doe, DOB: 01/01/2000, Phone: 123-456-7890" and a second data entry includes "Name: John Doe, DOB: 01/01/2000, Phone: 123-456-7892," the server 130 detects an error in the phone number, and associates the first data entry and the second data entry to the same entity, and may identify a possible error in the phone number. The server 130 may determine an attribute that is more consistent in different data entries to be a correct attribute, and an attribute that is less consistent in different data entries to be an incorrect attribute. The server 130 may present different attributes with errors, and allow a user to confirm (or select) a correct attribute. Assuming for another example that a third data entry includes "Name: Jonathan Doe, DOB: 2000/01/01, Phone: 123-456-7890," the server 130 detects a phonetic variation of the name, and associates the first data entry and the third data entry to the same entity. The server 130 may integrate the first data entry and the third data entry to indicate that the name of the entity may be "John Doe" or "Jonathan Doe." Assuming for another example that a fourth data entry includes "Name: John Doe, DOB: 2000/01/01, Phone: 123-456-7890," the server 130 detects a variation in the format of the date of birth represented, and associates the first data entry and the fourth data entry to the same entity. Additional implementations and operations of the server 130 are provided in detail below with respect to FIGS. 3 through 9.

Figure 2:
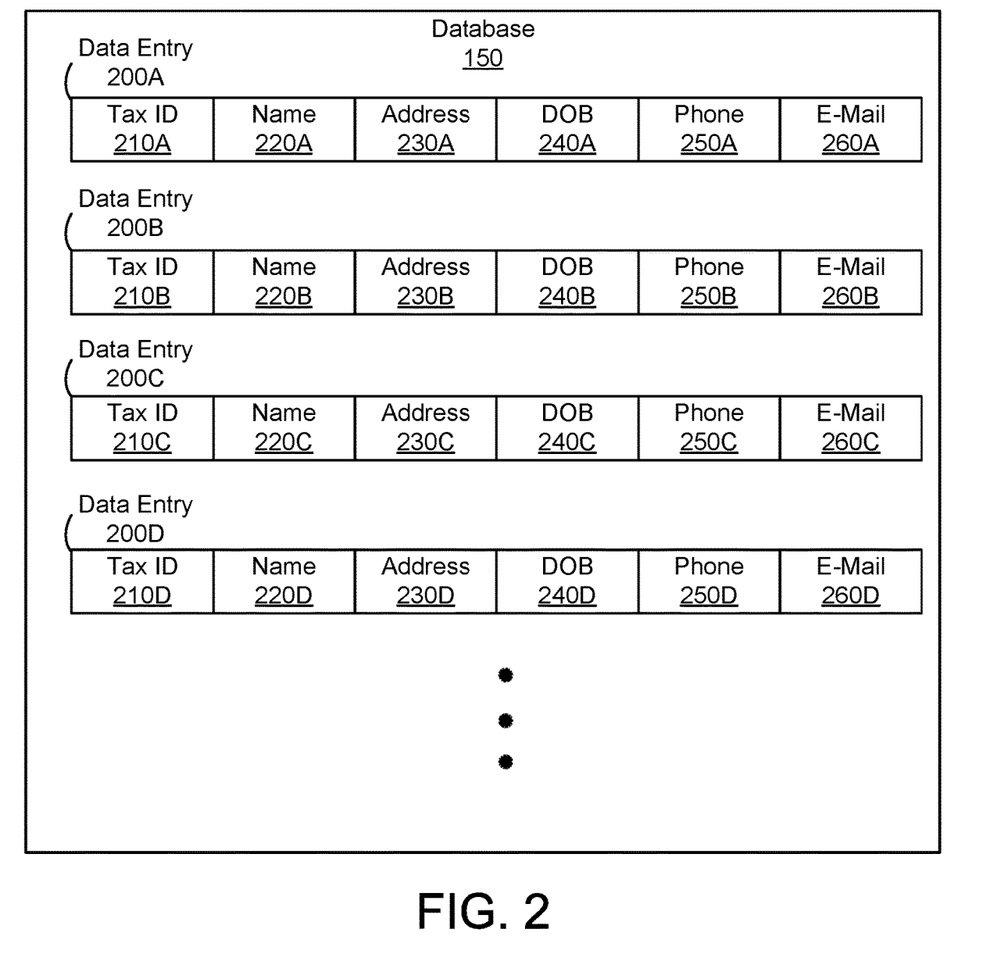
FIG. 2 is an illustration of example data entries stored by a database according to an example embodiment.

Referring to FIG. 2, illustrated are example data entries 200A, 200B . . . 200D stored by a database 150 according to an example embodiment. Each data entry 200 may be associated with a corresponding entity. Multiple data entries 200 may be associated with a single entity. For example, duplicative data entries 200 are generated from different data sources. Each data entry 200 may include attributes associated with the corresponding entity such as a tax identification number 210, name 220, address 230, date of birth 240, phone number 250, E-mail address 260, etc. In some embodiments, some data entry 200 lacks certain attributes or includes more attributes than shown in FIG. 2. In some embodiments, the database 150 stores more number of data entries (e.g., over 100 millions or billions).

Figure 3:
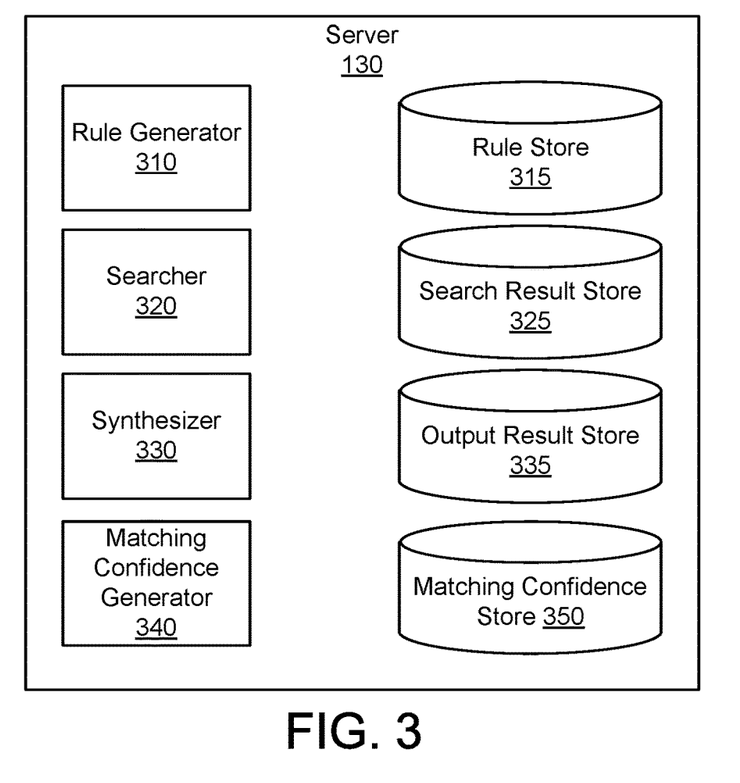
FIG. 3 is a block diagram of a server according to an example embodiment.

Referring to FIG. 3, illustrated is a block diagram of a server 130 according to an example embodiment. In some embodiments, the server 130 includes a rule generator 310, a rule store 315, a searcher 320, a search result store 325, a synthesizer 330, an output result store 335, a matching confidence generator 340, and a matching confidence store 350. These components may be embodied as hardware, software, or a combination thereof. These components operate together to identify data entries likely associated with same entity, and combine the identified data entries. In other embodiments, the server 130 includes more, fewer, or different components than shown in FIG. 3. In some embodiments, the server 130 includes a processor (not shown) and a non-transitory computer readable medium storing instructions that when executed by the processor cause various functionalities disclosed herein.

The rule generator 310 is a component that generates rules for searching data entries. In one aspect, the rule generator 310 generates rules with different combinations of attributes with different matching levels. In particular, the rule generator 310 may generate a first rule to search for data entries including exact matching of a first attribute and a non-exact matching of a second attribute. In addition, the rule generator 310 may generate a second rule to search for data entries including a non-exact matching of the first attribute and an exact matching of the second attribute. An exact matching of an attribute is an attribute exactly matching a corresponding attribute of another data entry. A non-exact matching of an attribute is an attribute different from a corresponding attribute of another data entry less than a predetermined threshold. Examples of non-exact matching of an attribute include an attribute with an error within a predetermined threshold (e.g., a number of different characters within a predetermined number), an attribute represented in a different format, and an attribute represented in a phonetic variation. Assuming for an example that a name of an attribute is "John Doe," an exact matching name is "John Doe," where a non-exact matching name can be "Jonathan Doe," or "Jon Doe." The rule may specify, for each attribute, different allowable variations or different formats. The rule generator 310 stores different rules at the rule store 315 or at the database 150. By generating different rules with different combinations of attributes with different matching levels, the searcher 320 can apply different rules to a large number (e.g., over millions) of data entries to find data entries likely associated with a single entity. Additional examples of the rules generated by the rule generator 310 are provided below with respect to FIG. 5 and FIGS. 6A through 6G.

The searcher 320 is a component that applies rules from the rule store 315 to obtain intermediate sets of data entries. The searcher 320 may search for, from a plurality of data entries stored by the database 150, data entries having attributes as specified by a rule to obtain an intermediate set of the data entries. In one aspect, the searcher 320 applies different rules on the plurality of data entries stored by the database 150 to obtain different intermediate sets of data entries. For example, the searcher 320 searches for data entries having an exact matching of a first attribute and a non-exact matching of a second attribute from a plurality of data entries stored by the database 150 as specified by a first rule to obtain a first intermediate set of data entries. In addition, the searcher 320 searches for data entries with a non-exact matching of the first attribute and an exact matching of the second attribute from a plurality of data entries stored by the database 150 as specified by a second rule to obtain a second intermediate set of data entries. The searcher 320 stores the intermediate sets of data entries at the search result store 325 or at the database 150.

The synthesizer 330 is a component that combines different intermediate sets of data entries to generate a synthesized set of likely associated data entries. The synthesizer 330 may store the synthesized set of data entries at the output result store 335 or at the database 150. In one approach, the synthesizer 330 applies connected component algorithm on the different intermediate sets of data entries to deduplicate similar or matching data entries. The synthesizer 330 may search for a common data entry between two or more intermediate sets of data entries, and links data entries in intermediate sets of data entries including the common data entry. For example, assuming that data entry A and data entry B are associated with an entity in the first intermediate set, and data entry B, data entry C, and data entry D are associated with the same entity in the second intermediate set. The synthesizer 330 links the data entries A, B, C, D to a single entity, because the first intermediate set and the second intermediate set both include a common data entry B. Accordingly, the synthesizer 330 can link data entries likely associated with the same entity allowing duplicative or redundant data entries to be deduplicated. Additional examples of synthesizing data entries are provided below with respect to FIG. 8.

The matching confidence generator 340 is a component that generates an indication of matching levels of the entities in a synchronized set. In one approach, the matching confidence generator 340 obtains a synthesized set of data entries associated with a single entity from the output result store 335. The matching confidence generator 340 determines, from the synthesized set of data entries, different pairs of data entries. The matching confidence generator 340 determines, for each pair of data entries, a corresponding similarity score. A similarity score indicates a matching level between a pair of data entries in a synthesized set of data entries. The matching confidence generator 340 may compare each attribute in a pair of data entries, and assign a highest similarity score (e.g., '1'), if the pair of data entries includes exactly matching attributes. As the amount of differences is increased, for example due to typographical errors, differences in formats, phonetic variations, or a combination of them, the matching confidence generator 340 may assign a corresponding similarity score lower than the highest similarity score (e.g., between '0' and '1'). The matching confidence generator 340 obtains a confidence score based on similarity scores of different pairs of entries. A confidence score is an indication of matching levels of data entries in the synthesized set of data entries. In one approach, the matching confidence generator 340 obtains an average of similarity scores of different pairs of entries in the synchronized set associated with an entity as the confidence score. In one aspect, the matching confidence generator 340 determines a corresponding level of the confidence score, and presents the identified level to the user. For example, the matching confidence generator 340 classifies a confidence score in a first range (e.g., between '0.5' and '0.7') as a "low matching," a confidence score in a second range (e.g., between '0.7' and '0.85') as a "moderate matching," and a confidence score in a third range (e.g., between '0.85' and '1.0') as a "high matching," and presents a level corresponding to the confidence score of the synthesized set of data entries to a user of the device 110. The matching confidence generator 340 may store the confidence scores and the confidence levels at the matching confidence store 350 or at the database 150.

Assuming for an example that the synthesized set of data entries includes data entries A, B, C. The matching confidence generator 340 determines a first similarity score of a pair of data entries A, B, a second similarity score of a pair of data entries B, C, and a third similarity score of a pair of data entries C, A. The matching confidence generator 340 obtains an average of the first similarity score, the second similarity score, and the third similarity score, as a confidence score of the synthesized set of data entries A, B, C. Moreover, the matching confidence generator 340 determines a confidence level according to the confidence score.

Figure 4:
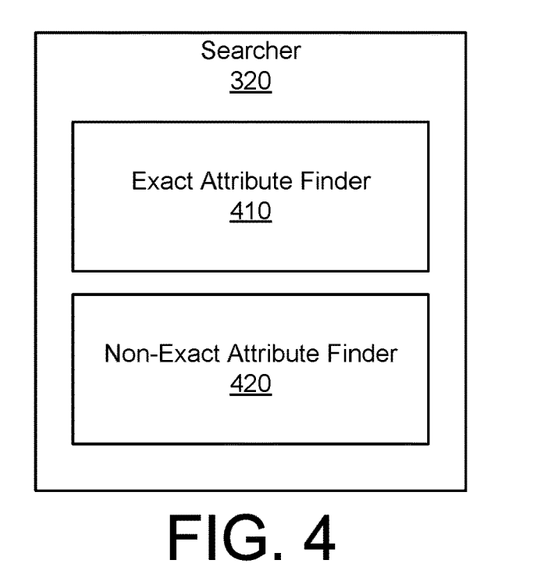
FIG. 4 is a block diagram of a searcher according to an example embodiment.

Referring to FIG. 4, illustrated is a block diagram of the searcher 320 according to an example embodiment. In one embodiment, the searcher 320 includes an exact attribute finder 410 and a non-exact attribute finder 420 to search for data entries associated with a single entity as specified by rules. The exact attribute finder 410 searches for data entries with exact matching attributes from data entries stored by the database 150. The non-exact attribute finder 420 searches for data entries with non-exact matching attributes from the data entries stored by the database 150. Examples of non-exact matching attributes include an attribute with an error within a predetermined threshold, an attribute represented in a different format, and an attribute represented in a phonetic variation. The exact attribute finder 410 and the non-exact attribute finder 420 stores search results as intermediate set of entities at the search result store 325 or at the database 150.

In one aspect, the non-exact attribute finder 420 searches for data entries including attributes with errors within a predetermined threshold (e.g., less than two characters off). The non-exact attribute finder 420 may compare each character in each attribute, and determine two attributes having less than the predetermined threshold differences as non-exact attributes. The predetermined threshold may be determined for each attribute. In one aspect, the user of the device 110 may adjust different predetermined thresholds for different attributes. In response to determining non-exact attributes, the non-exact attribute finder 420 may determine a correct attribute and an incorrect attribute, and correct the incorrect attribute. The non-exact attribute finder 420 may determine an attribute that is more consistent in different data entries to be a correct attribute, and an attribute that is less consistent in different data entries to be an incorrect error. The non-exact attribute finder 420 may present different attributes with errors, and allow a user to confirm a correct attribute.

In another aspect, the non-exact attribute finder 420 searches for data entries including attributes with phonetic variations. Examples of attributes with phonetic variations include "John," "Jon," "Jonathan," etc. In one approach, different allowable phonetic variations of an attribute are specified in each rule or stored by the server 130. The non-exact attribute finder 420 may compare an attribute with a list of allowable phonetic variations to determine whether the attribute is a phonetic variation or not. Alternatively or additionally, the non-exact attribute finder 420 applies a hash function to attributes according to phonetic algorithm to obtain hash values of attributes, and compares the hash values to determine whether the attributes are phonetic variations or not. For example, hash values of two attributes representing pronunciations of the two attributes with a difference less than a predetermined threshold indicate that the two attributes are phonetic variations with each other, where hash values of two attributes with a difference larger than the predetermined threshold indicate that the two attributes are not phonetic variations.

In another aspect, the non-exact attribute finder 420 searches for data entries including attributes represented in different formats. Examples of attributes represented in different formats include an address, a phone number, a date of birth, etc. The non-exact attribute finder 420 may store possible formats of different attributes (e.g., "MM-DD-YYYY", "YYYY-MM-DD", "DD-MM-YYYY" for date of birth) and search for data entries in the database 150 with different formats. In one approach, different allowable formats of an attribute are specified in each rule or stored by the server 130. The non-exact attribute finder 420 may normalize attributes represented in formats into a normalized format, and compare the normalized attributes to determine whether the attributes are the same, similar or different from each other.

Figure 5:
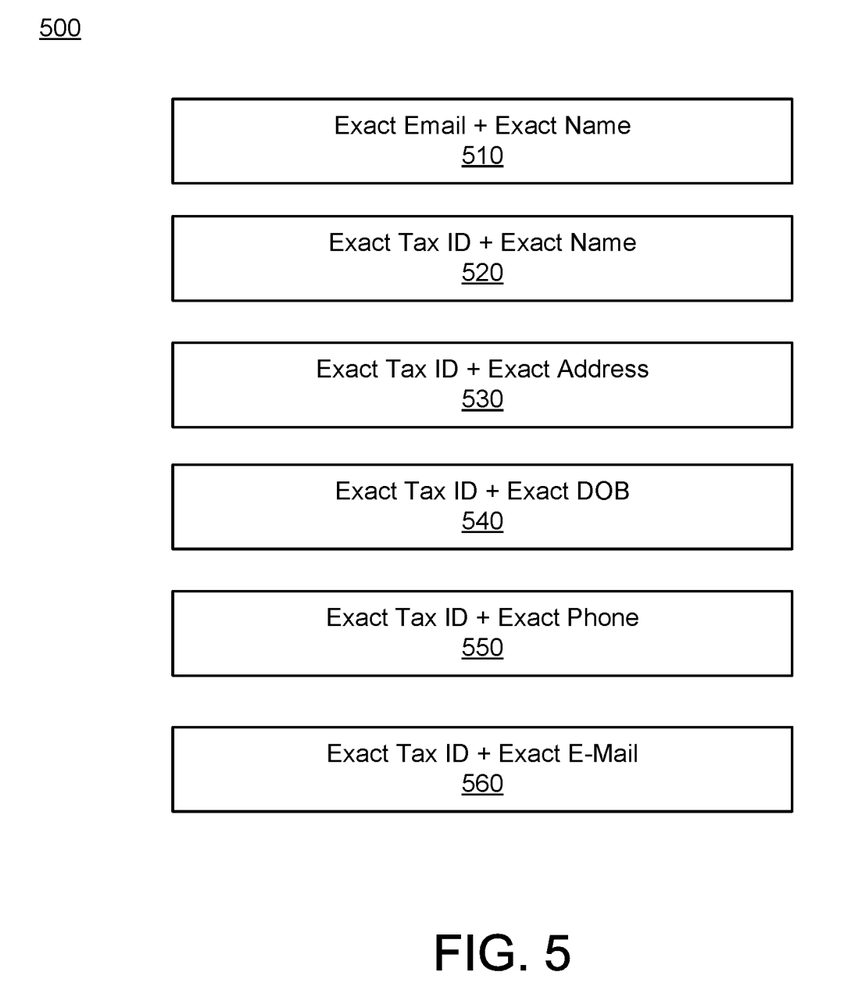
FIG. 5 is an illustration of a set of rules applied by the searcher according to an example embodiment.

Referring to FIG. 5, illustrated is a set of rules 500 with exact attributes applied by the searcher 320 according to an example embodiment. The set of rules 500 may be generated by the rule generator 310 and stored by the rule store 315. The set of rules 500 may be applied by the exact attribute finder 410 to obtain intermediate sets of data entries. In one aspect, the rule 510 specifies the searcher 320 to search for data entries including exact E-mail address and exact name. Similarly, the rule 520 specifies the searcher 320 to search for data entries including exact tax identification number and exact name. The rule 530 specifies the searcher 320 to search for data entries including exact tax identification number and exact address. The rule 540 specifies the searcher 320 to search for data entries including exact tax identification number and exact date of birth. The rule 550 specifies the searcher 320 to search for data entries including exact tax identification number and exact phone number. The rule 560 specifies the searcher 320 to search for data entries including exact tax identification number and exact E-mail address.

Referring to FIGS. 6A-6G, illustrated are different sets of rules applied by the searcher 320 according to an example embodiment. The set of rules 600 may be generated by the rule generator 310 and stored by the rule store 315. The set of rules 600 may be applied by the exact attribute finder 410 and the non-exact attribute finder 420 to generate intermediate sets. In one approach, the rules 600 specify the searcher 320 to search for data entries including an exact first name with other non-exact attributes, or data entries including an exact attribute with non-exact first name and another non-exact attribute. First name is used for searching, because last names may be changed after marriage. Accordingly, the rules 600 allow data entries for a single entity, which may have used different last names, to be found.

Figure 6A:
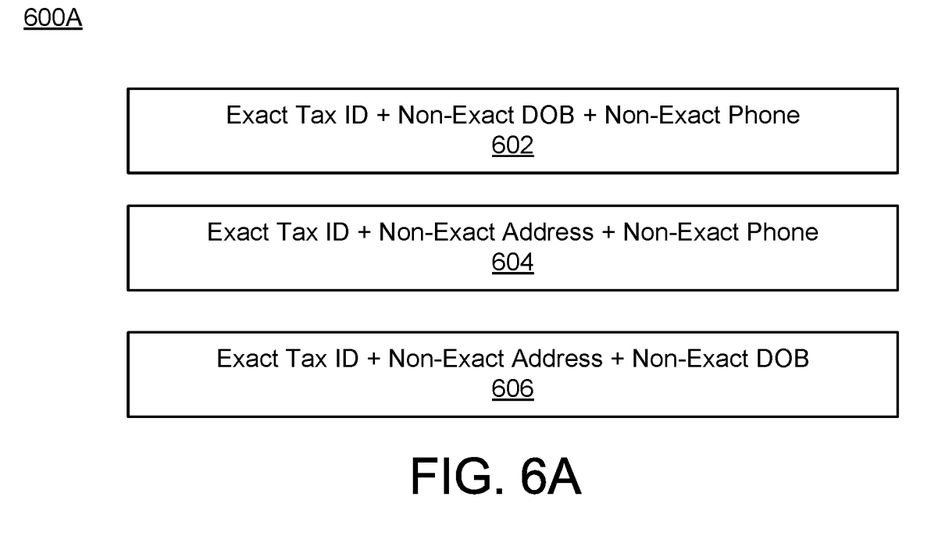
FIGS. 6A through 6G are illustrations of different sets of rules applied by the searcher according to an example embodiment.

In one aspect, the rules 600A of FIG. 6A including rules 602, 604, 606 specify the searcher 320 to search for data entries including an exact tax identification number and other non-exact attributes. In particular, the rule 602 specifies the searcher 320 to search for data entries including an exact tax identification number, a non-exact date of birth, and a non-exact phone number. The rule 604 specifies the searcher 320 to search for data entries including an exact tax identification number, a non-exact address, and a non-exact phone number. The rule 606 specifies the searcher 320 to search for data entries including an exact tax identification number, a non-exact address, and a non-exact date of birth.

In some embodiments, the rules 600A specifies the searcher 320 to search for a subset of data entries including exact tax identification number, and specifies the searcher 320 to search for other non-exact attributes (e.g., non-exact date of birth, non-exact phone number, non-exact address) from the subset of data entries. In one aspect, searching for non-exact attributes is computationally expensive than searching for exact attributes. By searching for non-exact attributes from the subset of data entries including the exact tax identification number, searching for non-exact attributes may be performed for a smaller number of data entries than the entire data entries stored by the database 150. Accordingly, the searcher 320 may look for data entries including the exact tax identification number and different combinations of non-exact attributes as specified by the rules 600A in a computationally efficient manner.

Figure 6B:
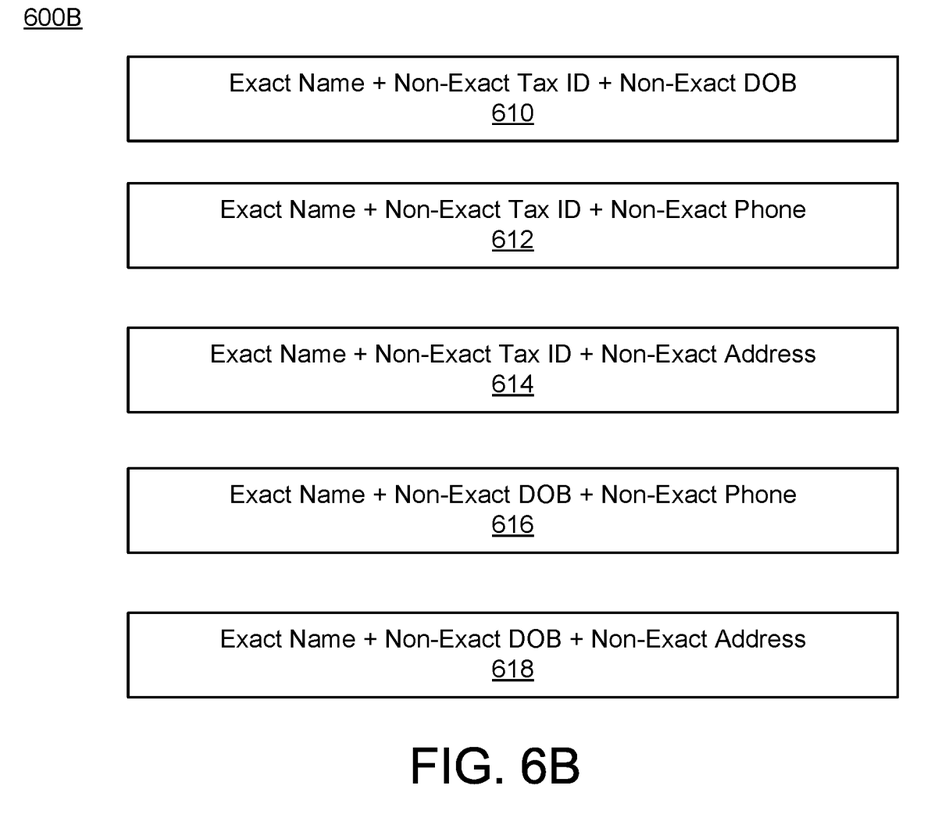

In one aspect, the rules 600B of FIG. 6B including rules 610, 612, 614, 616, 618 specify the searcher 320 to search for data entries including an exact name and other non-exact attributes. In particular, the rule 610 specifies the searcher 320 to search for data entries including an exact name, a non-exact tax identification number, and a non-exact date of birth. The rule 612 specifies the searcher 320 to search for data entries including an exact name, a non-exact tax identification number, and a non-exact phone number. The rule 614 specifies the searcher 320 to search for data entries including an exact name, a non-exact tax identification number, and a non-exact address. The rule 616 specifies the searcher 320 to search for data entries including an exact name, a non-exact date of birth, and a non-exact phone number. The rule 618 specifies the searcher 320 to search for data entries including an exact name, a non-exact date of birth, and a non-exact address.

In some embodiments, the rules 600B specifies the searcher 320 to search for a subset of data entries including exact name, and specifies the searcher 320 to search for other non-exact attributes (e.g., non-exact tax identification number, non-exact date of birth, non-exact phone number, non-exact address) from the subset of data entries. By searching for non-exact attributes from the subset of data entries including the exact name, searching for non-exact attributes may be performed for a smaller number of data entries than the entire data entries stored by the database 150. Accordingly, the searcher 320 may look for data entries including the exact name and different combinations of non-exact attributes as specified by the rules 600B in a computationally efficient manner.

Figure 6C:
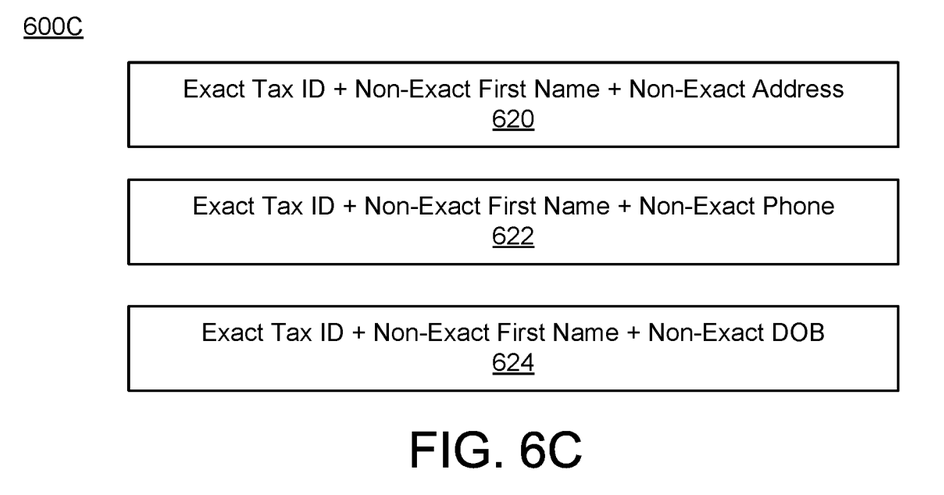

In one aspect, the rules 600C of FIG. 6C including rules 620, 622, 624 specify the searcher 320 to search for data entries including an exact tax identification number, a non-exact first name, and another non-exact attribute. In particular, the rule 620 specifies the searcher 320 to search for data entries including an exact tax identification number, a non-exact first name, and a non-exact address. The rule 622 specifies the searcher 320 to search for data entries including an exact tax identification number, a non-exact first name, and a non-exact phone number. The rule 624 specifies the searcher 320 to search for data entries including an exact tax identification number, a non-exact first name, and a non-exact date of birth.

In some embodiments, the rules 600C specifies the searcher 320 to search for a subset of data entries including exact tax identification number and non-exact first name, and specifies the searcher 320 to search for another non-exact attribute (e.g., non-exact address, non-exact phone number, non-exact date of birth) from the subset of data entries. By searching for non-exact attributes from the subset of data entries including the exact tax identification number and the non-exact first name, searching for non-exact attributes may be performed for a smaller number of data entries than the entire data entries stored by the database 150. Accordingly, the searcher 320 may look for data entries including the exact tax identification number and the non-exact first name, and different combinations of non-exact attributes as specified by the rules 600C in a computationally efficient manner.

Figure 6D:
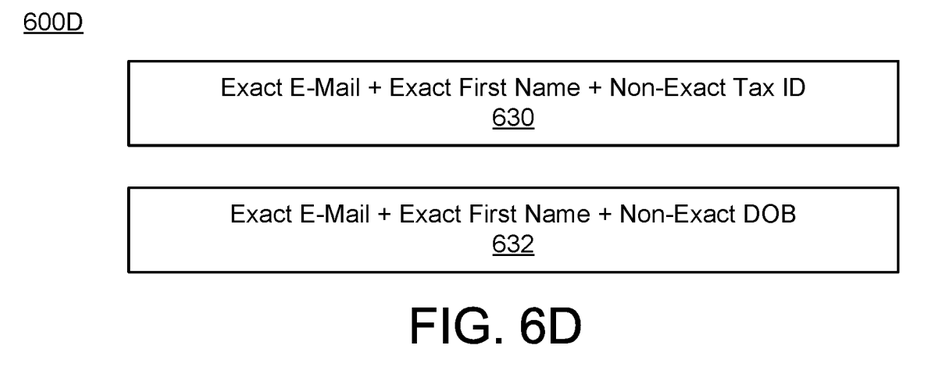

In one aspect, the rules 600D of FIG. 6D including rules 630, 632 specify the searcher 320 to search for data entries including an exact E-mail address, an exact first name, and a non-exact attribute. In particular, the rule 630 specifies the searcher 320 to search for data entries including an exact E-mail address, an exact first name, and a non-exact tax identification number. The rule 632 specifies the searcher 320 to search for data entries including an exact E-mail address, an exact first name, and a non-exact date of birth.

In some embodiments, the rules 600D specifies the searcher 320 to search for a subset of data entries including exact E-mail and an exact first name, and specifies the searcher 320 to search for another non-exact attribute (e.g., non-exact tax identification number, non-exact date of birth) from the subset of data entries. By searching for non-exact attributes from the subset of data entries including the exact E-mail and the exact first name, searching for non-exact attributes may be performed for a smaller number of data entries than the entire data entries stored by the database 150. Accordingly, the searcher 320 may look for data entries including the exact E-mail and the exact first name, and different combinations of non-exact attributes as specified by the rules 600D in a computationally efficient manner.

Figure 6E:
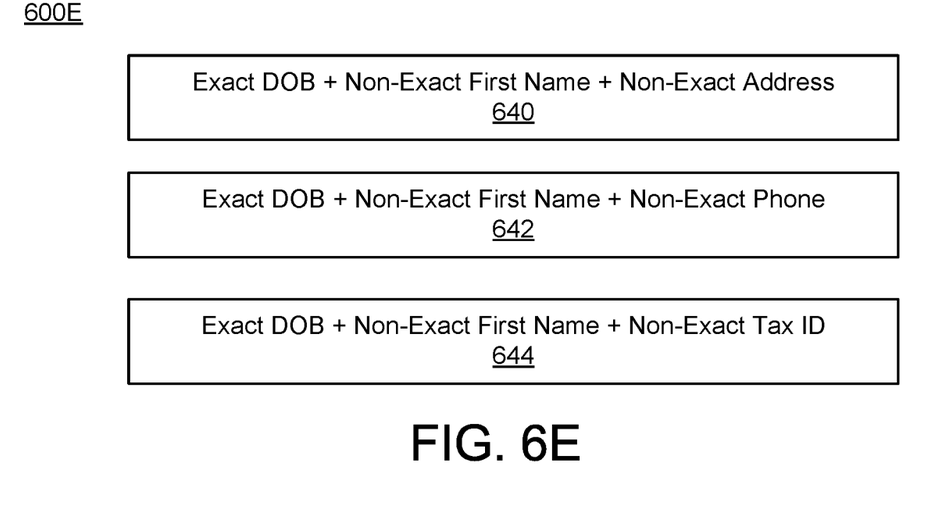

In one aspect, the rules 600E of FIG. 6E including rules 640, 642, 644 specify the searcher 320 to search for data entries including an exact date of birth, a non-exact first name, and another non-exact attribute. In particular, the rule 640 specifies the searcher 320 to search for data entries including an exact date of birth, a non-exact first name, and a non-exact address. The rule 642 specifies the searcher 320 to search for data entries including an exact date of birth, a non-exact first name, and a non-exact phone number. The rule 644 specifies the searcher 320 to search for data entries including an exact date of birth, a non-exact first name, and a non-exact tax identification number.

In some embodiments, the rules 600E specifies the searcher 320 to search for a subset of data entries including exact date of birth and a non-exact first name, and specifies the searcher 320 to search for another non-exact attribute (e.g., non-exact address, non-exact phone number, and non-exact tax identification number) from the subset of data entries. By searching for non-exact attributes from the subset of data entries including the exact date of birth and the non-exact first name, searching for non-exact attributes may be performed for a smaller number of data entries than the entire data entries stored by the database 150. Accordingly, the searcher 320 may look for data entries including the exact date of birth and the non-exact first name, and different combinations of non-exact attributes as specified by the rules 600E in a computationally efficient manner.

Figure 6F:
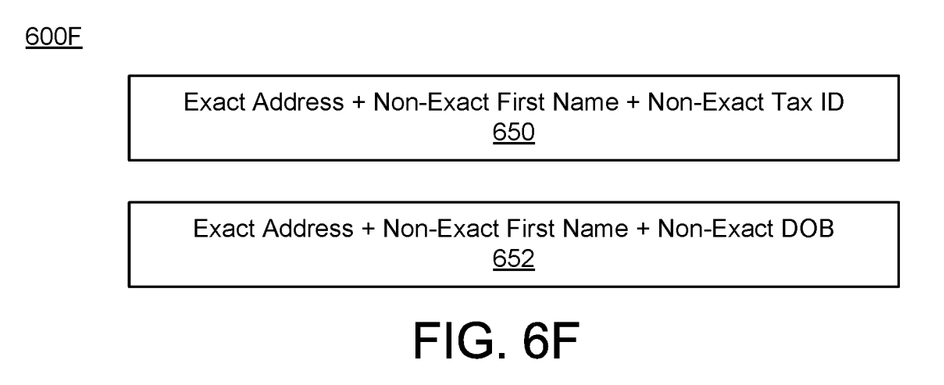

In one aspect, the rules 600F of FIG. 6F including rules 650, 652 specify the searcher 320 to search for data entries including an exact address, a non-exact first name, and another non-exact attribute. In particular, the rule 650 specifies the searcher 320 to search for data entries including an exact address, a non-exact first name, and a non-exact tax identification number. The rule 652 specifies the searcher 320 to search for data entries including an exact address, a non-exact first name, and a non-exact date of birth.

In some embodiments, the rules 600F specifies the searcher 320 to search for a subset of data entries including exact address and a non-exact first name, and specifies the searcher 320 to search for another non-exact attribute (e.g., non-exact tax identification number and non-exact date of birth) from the subset of data entries. By searching for non-exact attributes from the subset of data entries including the exact address and the non-exact first name, searching for non-exact attributes may be performed for a smaller number of data entries than the entire data entries stored by the database 150. Accordingly, the searcher 320 may look for data entries including the exact address and the non-exact first name, and different combinations of non-exact attributes as specified by the rules 600F in a computationally efficient manner.

Figure 6G:
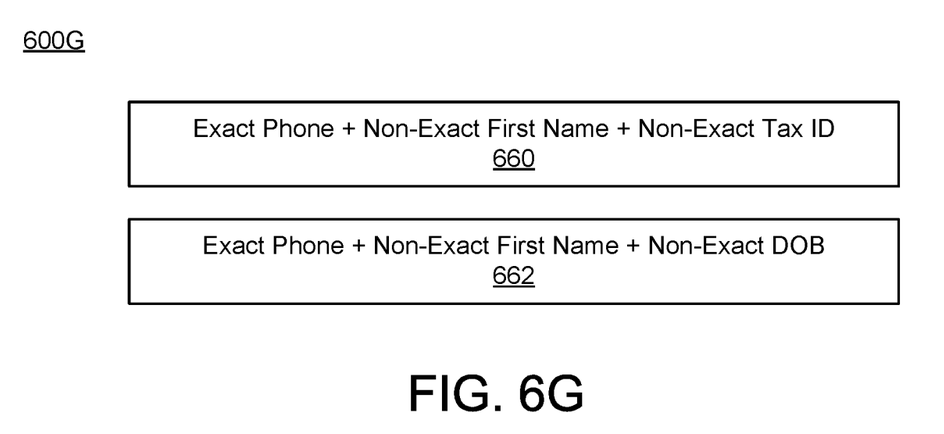

In one aspect, the rules 600G of FIG. 6G including rules 660, 662 specify the searcher 320 to search for data entries including an exact phone number, a non-exact first name, and another non-exact attribute. In particular, the rule 660 specifies the searcher 320 to search for data entries including an exact phone number, a non-exact first name, and a non-exact tax identification number. The rule 662 specifies the searcher 320 to search for data entries including an exact phone number, a non-exact first name, and a non-exact date of birth.

In some embodiments, the rules 600G specifies the searcher 320 to search for a subset of data entries including exact phone number and a non-exact first name, and specifies the searcher 320 to search for another non-exact attribute (e.g., non-exact tax identification number and non-exact date of birth) from the subset of data entries. By searching for non-exact attributes from the subset of data entries including the exact phone number and the non-exact first name, searching for non-exact attributes may be performed for a smaller number of data entries than the entire data entries stored by the database 150. Accordingly, the searcher 320 may look for data entries including the exact phone number and the non-exact first name, and different combinations of non-exact attributes as specified by the rules 600G in a computationally efficient manner.

Figure 7:
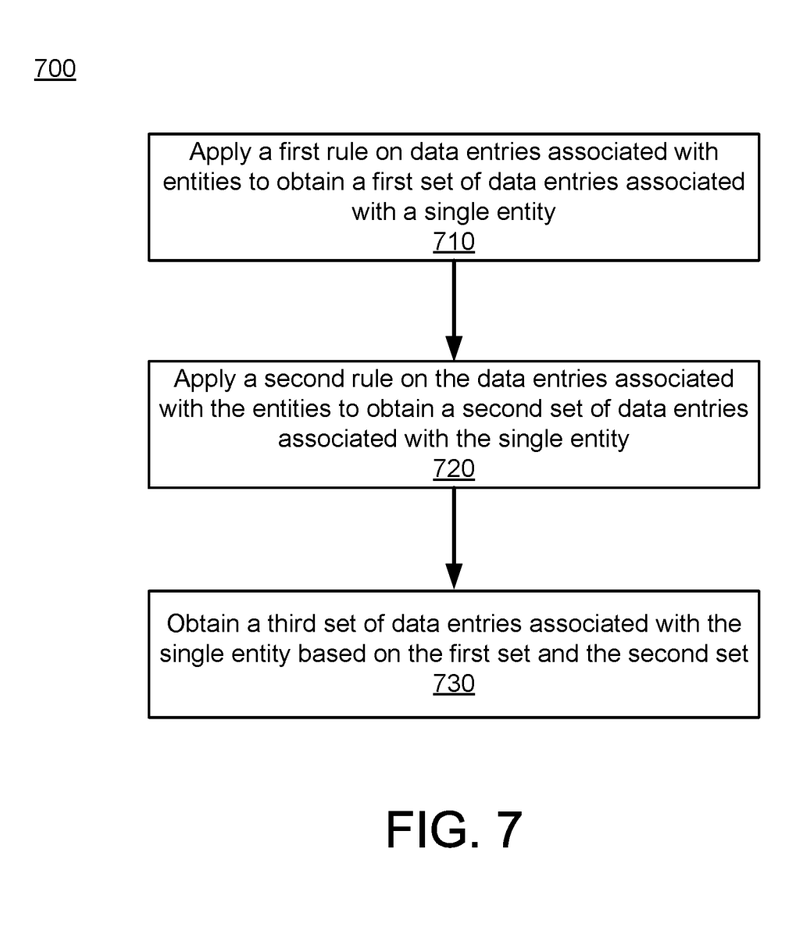
FIG. 7 is a flow chart illustrating a process of performing entity resolution according to an example embodiment.

Referring to FIG. 7, illustrated is a flow chart illustrating a process 700 of performing entity resolution according to an example embodiment. The process 700 may be performed by the server 130. In other embodiments, other entities may perform the process 700. In other embodiments, the process 700 includes more, fewer, or different steps than shown in FIG. 7.

The server 130 applies 710 a first rule on a plurality of data entries to obtain a first set, and applies 720 a second rule on the plurality of data entries to obtain a second set. The first rule specifies the server 130 to search for data entries including a first group of attributes from the set of entities and the second rule specifies the server 130 to search for data entries including a second group of attributes from the set of entities. The first rule and the second rule may specify the server 130 to search for same attributes but with different matching levels. For example, the first group of attributes may include an exact matching attribute of a first attribute and a non-exact matching attribute of a second attribute, where the second group of attributes may include a non-exact matching attribute of the first attribute and an exact matching attribute of the second attribute.

The server 130 obtains 730 a third set of data entries based on the first set of data entries and the second set of data entries. The server 130 may apply connected component algorithm to link data entries likely associated with a single entity to remove duplicative or redundant data entries. For example, the server 130 identifies a common data entry in the first set of data entries and the second set of data entries, and in response to finding a common data entry, links data entries in the first set and the second set. By searching for different combination of attributes with different matching levels, different data entries likely associated with a single entity can be identified.

Figure 8:
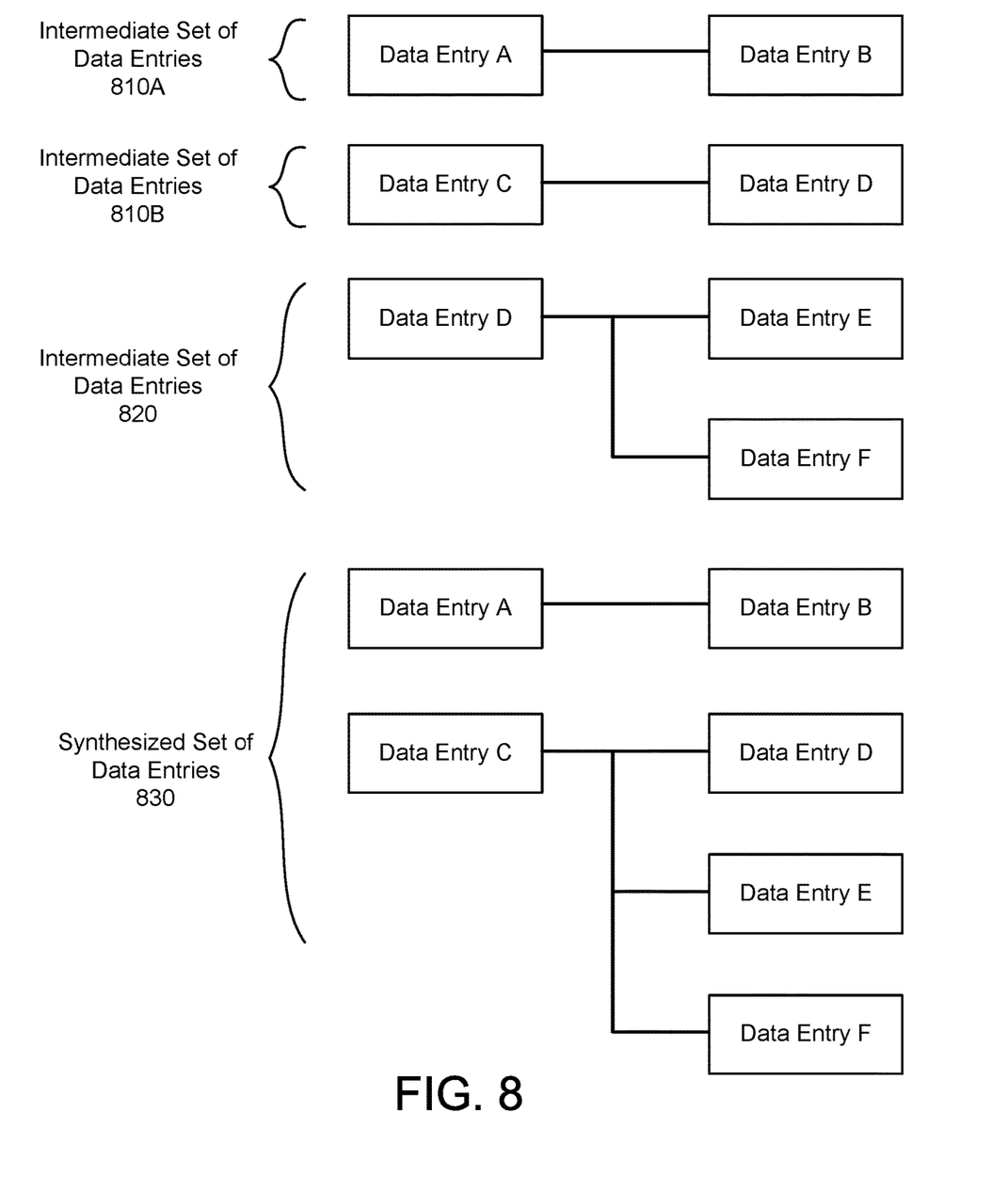
FIG. 8 illustrate example data entries for performing synthesizing of different sets of data entries, according to an example embodiment.

Referring to FIG. 8, illustrated are example data entries for performing synthesizing of different sets of data entries based on connected component algorithm, according to an example embodiment. In the example shown in FIG. 8, data entries A-F are shown. Assuming for an example that data entries A, B include exact or similar attributes according to a first rule, and data entries C, D include exact or similar attributes according to the first rule, such that the intermediate set of data entries 810A includes data entries A, B associated with a first entity and the intermediate set of data entries 810B includes data entries C, D associated with a second entity. Further assuming that data entries D, E, F include exact or similar attributes according to a second rule, such that the intermediate set of data entries 820 includes data entries D, E, F associated with a third entity. The synthesizer 330 may determine that the intermediate set of data entries 810B according to the first rule and the intermediate set of data entries 820 according to the second rule share the data entry D, and link the data entries C, D, E, F to be associated with the same entity. Furthermore, the synthesizer 330 generates the synthesized sets of data entries 830, where the data entries A, B are associated with the first entity and data entries C, D, E, F are associated with the second entity. As illustrated in FIG. 8, by applying different rules with different combination of matching levels of different attributes, data entries associated with a single entity can be identified while avoiding over-matching or under-matching.

Figure 9:
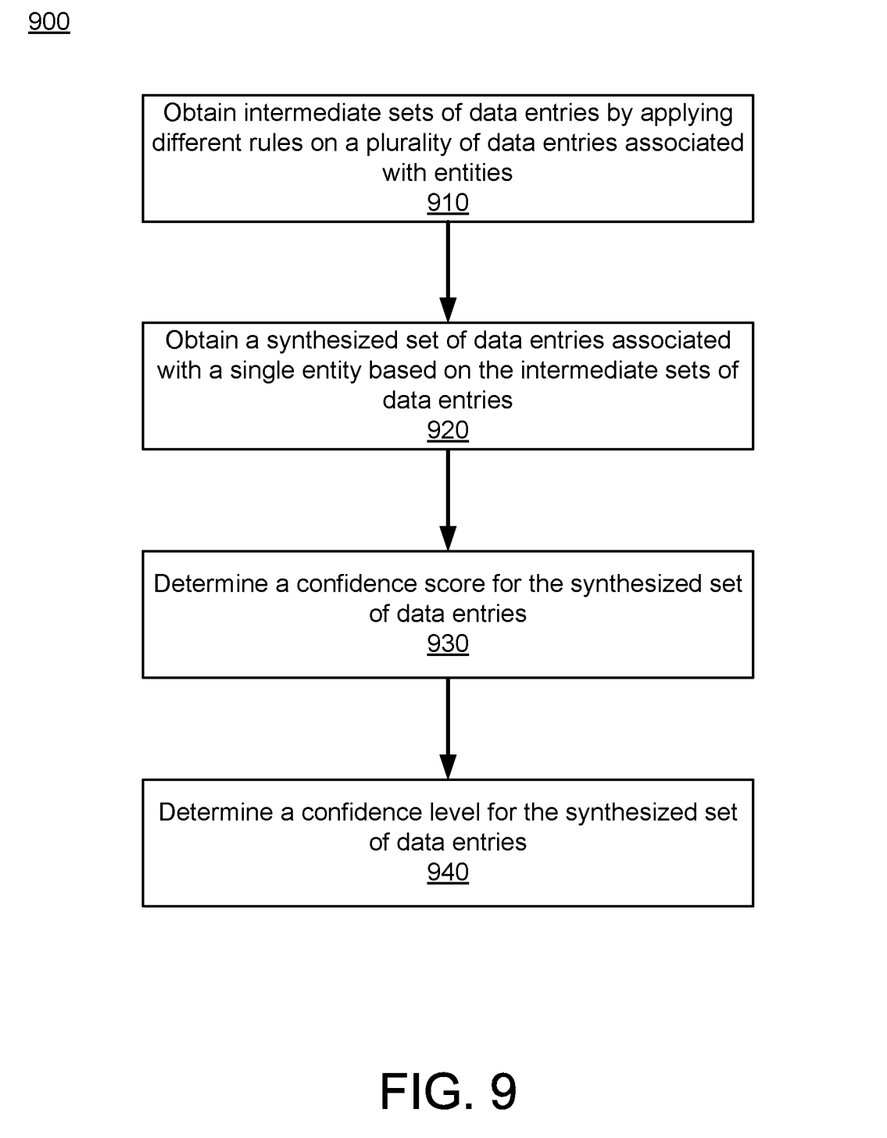
FIG. 9 is a flow chart illustrating a process of performing entity resolution according to an example embodiment.

Referring to FIG. 9, illustrated is a flow chart illustrating a process 900 of performing entity resolution according to an example embodiment. The process 900 may be performed by the server 130. In other embodiments, other entities may perform the process 900. In other embodiments, the process 900 includes more, fewer, or different steps than shown in FIG. 9.

The server 130 obtains 910 intermediate sets of data entries by applying different rules on a plurality of data entries associated with entities. Different rules may specify the server 130 to search for data entries including attributes with different matching levels. In one approach, the server 130 applies two or more of different rules as described above with respect to FIGS. 5 and 6A through 6G on a plurality of data entries stored by the database to obtain different intermediate sets of data entries associated with a single entity.

The server 130 obtains 920 a synthesized set of data entries associated with the single entity based on the intermediate sets of data entries. The server 130 may apply connected component algorithm on different intermediate sets of data entries to link data entries likely associated with a single entity, for example, as described above with respect to FIG. 8.

The server 130 determines 930 a confidence score for the synthesized set of data entries. The server 130 may determine, from the synthesized set of data entries, different pairs of data entries. The server 130 determines, for each pair of data entries, a corresponding similarity score according to a similarity between attributes of the pair of data entries. The server 130 may obtain a confidence score based on similarity scores of different pairs of entries. The server 130 may obtain an average of similarity scores of different pairs of entries as the confidence score. Through the device 110, the confidence score, confidence level, or both of the synthesized set of data entries can be presented to a user of the device 110.

The server 130 determines 940 a confidence level for the synthesized set of data entries according to the confidence score. For example, the server 130 classifies a confidence score in a first range (e.g., between '0.5' and '0.7') as a "low matching," a confidence score in a second range (e.g., between '0.7' and '0.85') as a "moderate matching," and a confidence score in a third range (e.g., between '0.85' and '1.0') as a "high matching," and presents a confidence level corresponding to the confidence score of the synthesized set of data entries.

The preceding description is directed to certain implementations for the purposes of describing the innovative aspects of this disclosure. However, a person having ordinary skill in the art will readily recognize that the teachings herein can be applied in a multitude of different ways. The described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, wearable devices, clocks, calculators, television monitors, flat panel displays, electronic reading devices (such as e-readers), computer monitors, auto displays (such as odometer and speedometer displays), cockpit controls and displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, in addition to non-EMS applications), aesthetic structures (such as display of images on a piece of jewelry or clothing) and a variety of EMS devices.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, directional terms are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A non-transitory computer readable medium comprising instructions when executed by a processor cause the processor to:
   apply a first rule on a plurality of data entries associated with a plurality of entities by:
      determining hash values of attributes of a first attribute type of the plurality of data entries using a phonetic algorithm hashing function;
      identifying a first subset of data entries that have attributes of the first attribute type with matching hash values;
      determining distances between attributes of a second attribute type of the data entries of the first subset using an edit distance measuring function; and
      identifying, from the first subset of data entries, a first set of data entries that have attributes of the second attribute type with distances between each other of less than a first threshold;
   apply a second rule on the plurality of data entries associated with the plurality of entities by:
      identifying a second subset of data entries that have attributes of the first attribute type that exactly match;

determining distances between attributes of a third attribute type of the data entries of the second subset using the edit distance measuring function; and identifying, from the second subset, a second set of data entries that have attributes of the third attribute type with distances between each other of less than a second threshold;

automatically link the first set of data entries with a single entity, wherein each data entry of the first set of data entries is linked with only the single entity; and determine, after linking each data entry, a confidence score for the single entity by comparing corresponding attributes of the first set of data entries.

2. The non-transitory computer readable medium of claim 1, further comprising instructions that, when executed by the processor, cause the processor to:

automatically link the second set of data entries with the single entity, wherein each data entry of the second set of data entries is linked with only the single entity.

3. The non-transitory computer readable medium of claim 2, further comprising instruction that, when executed by the processor, cause the processor to:

identify redundant data entries between the first set of data entries and the second set of data entries,
wherein the instructions cause the processor to automatically link the first set of data entries and the second set of data entries with the single entity so there are not any redundant data entries linked to the single entity.

4. The non-transitory computer readable medium of claim 1, wherein the instructions that cause the processor to automatically link the first set of data entries further comprise instructions when executed by the processor cause the processor to:

obtain a third set of data entries based on a common data entry between the first set of data entries and the second set of data entries; and link the third set of data entries to the single entity; and wherein the instructions that cause the processor to determine the confidence score for the first set of data entries further comprise instructions when executed by the processor cause the processor to:

determine the confidence score for the single entity by comparing corresponding attributes of the first set of data entries and the second set of data entries.

5. The non-transitory computer readable medium of claim 1, wherein the instructions further cause the processor to apply the first rule by:

identifying data entries that have attributes of a third attribute type that exactly match;

wherein the instructions cause the processor to identify the first subset of data entries based on the identified data entries that have attributes of the third attribute type that exactly match.

6. The non-transitory computer readable medium of claim 1, wherein the first attribute is a name, and
wherein the second attribute is a date of birth.

7. The non-transitory computer readable medium of claim 1, wherein the instructions when executed by the processor further cause the processor to automatically link the first set of data entries with the single entity by:

obtaining a third set of data entries based on a common data entry between the first set of data entries and the second set of data entries; and linking the third set of data entries to the single entity.

8. A computer-implemented method comprising: applying, by a computing device, a first rule, on a plurality of data entries associated with a plurality of entities by:

determining hash values of attributes of a first attribute type of the plurality of data entries using a phonetic algorithm hashing function;

identifying a first subset of data entries that have attributes of the first attribute type with matching hash values;

determining distances between attributes of a second attribute type of the data entries of the first subset using an edit distance measuring function;

identifying, from the first subset of data entries, a first set of data entries that have attributes of the second attribute type with distances between each other of less than a first threshold;

applying, by the computing device, a second rule on the plurality of data entries associated with the plurality of entities by:

identifying a second subset of data entries that have attributes of the first attribute type that exactly match;

determining distances between attributes of a third attribute type of the data entries of the second subset using the edit distance measuring function; and identifying, from the second subset, a second set of data entries that have attributes of the third attribute type with distances between each other of less than a second threshold;

automatically linking, by the computing device, the first set of data entries with a single entity, wherein each data entry of the first set of data entries is linked with only the single entity; and determining, by the computing device after linking each data entry, a confidence score for the single entity by comparing corresponding attributes of the first set of data entries.

9. The method of claim 8, automatically linking, by the computing device, the second set of data entries with the single entity, wherein each data entry of the second set of data entries is linked with only the single entity.

10. The method of claim 9, further comprising:

identifying, by the computing device, redundant data entries between the first set of data entries and the second set of data entries, wherein automatically linking the first set of data entries with the single entity comprises linking the first set of data entries and the second set of data entries with the single entity so there are not any redundant data entries linked to the single entity.

11. The method of claim 8, further comprising:

identifying, by the computing device, data entries that have attributes of a third attribute type that exactly match;

wherein identifying the first subset of data entries comprises identifying, by the computing device, the first subset of data entries based on the identified data entries that have attributes of the third attribute type that exactly match.

12. The method of claim 8, wherein automatically linking the first set of data entries with the single entity comprises:

obtaining, by the computing device, a third set of data entries based on a common data entry between the first set of data entries and the second set of data entries; and linking, by the computing device, the third set of data entries to the single entity.

13. A server comprising:

a processor having programmed instructions that when executed cause the processor to:

apply a first rule on a plurality of data entries associated with a plurality of entities to obtain a first set of data entries having a first group of attributes by:
    determining hash values of attributes of a first attribute type of the plurality of data entries using a phonetic algorithm hashing function;
    identifying a first subset of data entries that have attributes of the first attribute type with matching hash values;
    determining distances between attributes of a second attribute type of the data entries of the first subset using an edit distance measuring function;
    identifying, from the first subset of data entries, a first set of data entries that have attributes of the second attribute type with distances between each other of less than a first threshold; and
apply a second rule on the plurality of data entries associated with the plurality of entities by:
    identifying a second subset of data entries that have attributes of the first attribute type that exactly match;
    determining distances between attributes of a third attribute type of the data entries of the second subset using the edit distance measuring function; and
    identifying, from the second subset, a second set of data entries that have attributes of the third attribute type with distances between each other of less than a second threshold; and
a synthesizer coupled to the processor, the synthesizer configured to:
    automatically link the first set of data entries with a single entity, wherein each data entry of the first set of data entries is linked with only the single entity; and
    determine, after linking each data entry, a confidence score for the single entity by comparing corresponding attributes of the first set of data entries.

\* \* \* \* \*